UNITED STATES PATENT OFFICE.

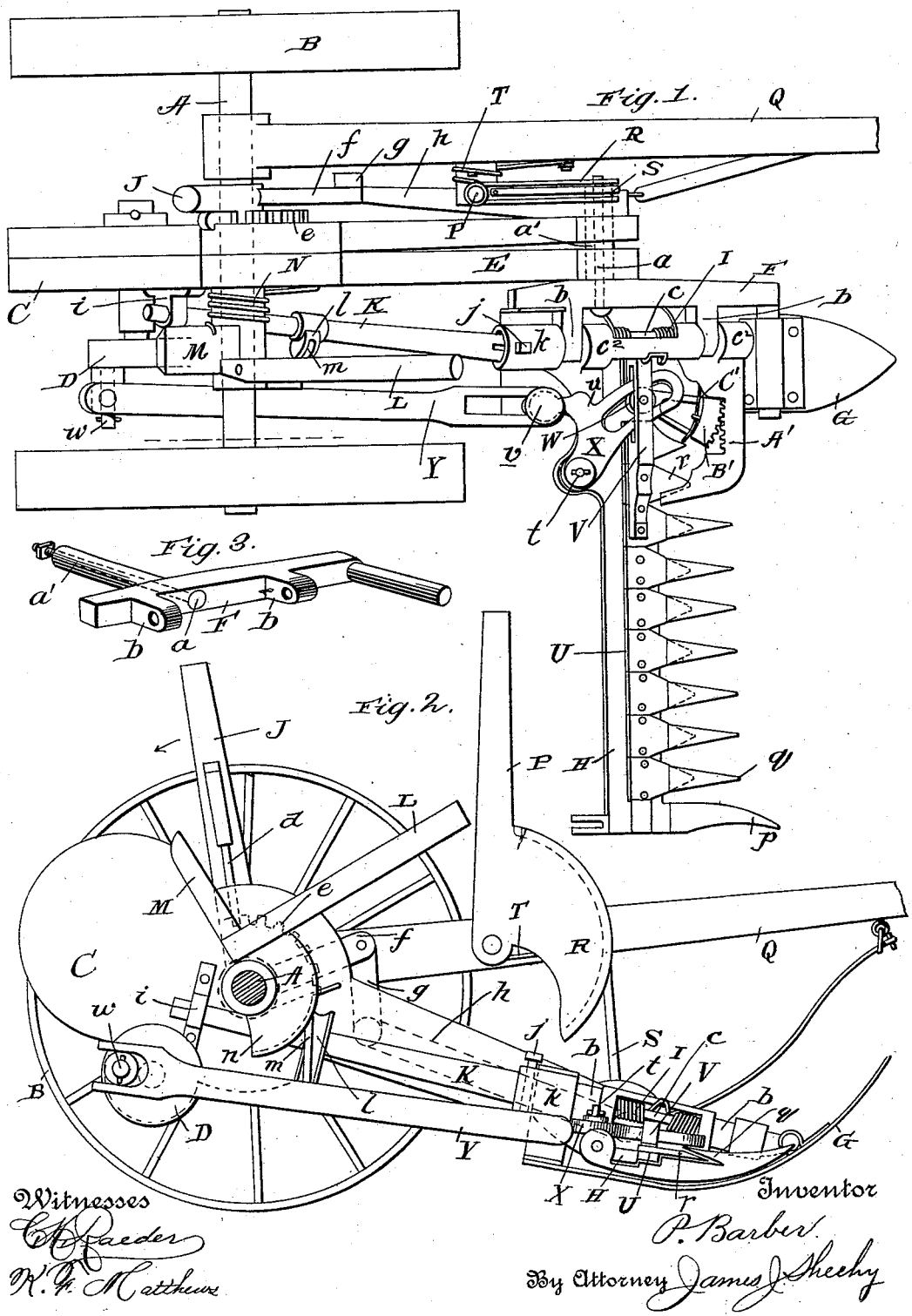

PHILEMON BARBER, OF REED CITY, MICHIGAN.

HARVESTER.

SPECIFICATION forming part of Letters Patent No. 534,355, dated February 19, 1895.

Application filed June 15, 1894. Serial No. 514,629. (No model.)

*To all whom it may concern:*

Be it known that I, PHILEMON BARBER, a citizen of the United States, residing at Reed City, in the county of Osceola and State of Michigan, have invented certain new and useful Improvements in Harvesters; and I do declare the following to be a full, clear, and exact description of the invention, such as will enable others skilled in the art to which it appertains to make and use the same.

My invention relates to improvements in harvesters or mowing machines; and it has for one of its objects to provide a harvester or mower embodying a very simple, durable and compact construction whereby the cutting apparatus may be readily rocked transversely or in the direction of its width and may be swung laterally into an upright position, and whereby the entire working machinery may be raised from the ground when it is desired to move the harvester from one place to another.

Another object of the invention is to provide a very simple and durable mechanism for transmitting reciprocatory motion to the sickle bar; and still another object is to improve the efficiency of the sickle bar by providing means adapted to prevent wabbling or lateral play of the same and also adapted to aid the return movement of the sickle bar.

Other objects and advantages will be fully understood from the following description and claims when taken in connection with the annexed drawings, in which—

Figure 1, is a plan view of my improved harvester or mowing machine. Fig. 2, is a side elevation of the same with one of the traveling wheels removed and the axle in section, and Fig. 3, is a detail, perspective view of the head bar removed.

Referring by letter to said drawings:—A, indicates the axle of the machine, having traction wheels B, at its ends, and C, indicates the casing in which the gearing for transmitting motion from the axle to the crank wheel D, is inclosed. This casing C, is pivotally mounted on the axle for a purpose presently described and it is provided with the forwardly extending portion E, designed for the connection of the head bar F, of the cutting apparatus. The said head bar F, is disposed on one side of the extended portion E, of the casing, as shown in Fig. 1, and it is pivotally connected to said portion E, by a transversely disposed bolt $a$, and is provided with a lateral trunnion $a'$, journaled in the portion E, so as to enable it to swing in the direction of the length of the harvester, and it has connected to it an ordinary shoe or runner G, designed to rest upon the ground and hold the cutting apparatus clear of the same. Upon its outer side, the head bar F, is provided with lugs as $b$, to which is pivotally connected by a bolt $c$, or the like, the transversely arranged finger bar or frame H which has eyes $c^2$, to receive said bolt as shown. The outer end of this finger bar or frame H, is on account of its weight, likely to drag upon the ground and impose strain on its connection to the bar F; and I therefore provide the spring I, which is designed and adapted to sustain the outer end of the finger bar above the ground and obviate the objectionable dragging of the same. This spring I, is connected to the bar or frame H, and the bar F, and is coiled upon the pivot bolt $c$, as better shown in Fig. 1; and it serves, by holding the outer end of the finger bar or frame above the ground to reduce strain upon the bolt $c$, and to increase the efficiency of the cutting apparatus.

J, indicates the lever through the medium of which the bar F, and consequently the finger bar or frame H, are rocked in the direction of the length of the machine. This lever J, is pivoted or fulcrumed on the axle and is provided with a detent $d$, designed to engage the teeth of the segmental rack $e$, fixed on the casing C, and said lever is also provided with an angular arm $f$, which is connected by a link $g$, with an arm as $h$, fixedly connected to the trunnion $a'$, of the bar F, whereby it will be seen that the fingers of the finger bar may be quickly raised above the ground to avoid a stone or other obstruction in their path and may be adjustably fixed at various elevations in accordance with the kind of soil and the condition of the grain.

In order that the finger bar or frame H, and its adjuncts may be readily swung in a transverse direction to a vertical position, I provide the rock shaft K, which is journaled at one end in a lug $i$, on the casing C, and is connected at its opposite end by a bolt as $j$, to a socket $k$, fixedly connected to the finger bar or frame. Said shaft K, is provided at an intermediate point of its length with a crank segment $l$, and this segment is connected by a cord or chain $m$, with a similar segment $n$, fixedly connected to or formed integral with the hand lever L, and the foot lever M, which are fulcrumed on the axle A, whereby it will be seen that the driver may with his hand or foot readily raise the cutting apparatus into a vertical position, and hold it in such position, to avoid a large obstruction in the path of the machine or for any other purpose. The cutting apparatus is quite heavy in practice, and I therefore prefer to employ a coiled spring as N, connected to the lever M, and the casing C, in order to assist the driver in raising the cutting apparatus.

The casing C, of the machine is as before stated, pivoted on the axle, and the cutting apparatus and all of the other parts which are connected with said casing C, and may therefore be raised from the ground by elevating the forward or extended portion E, of said casing. For this purpose I provide the lever P, which is fulcrumed on the draft pole or tongue Q, and is provided with a cam segment R, which is connected with the extended portion E, of the casing C, by a rope or chain S. By moving the lever P, rearwardly, the forward or extended portion of the casing together with all of the parts connected therewith may be raised from the ground; and in order to render such elevation of the casing more easy, I provide the coil spring T, which has its ends connected to the lever P, and the tongue Q, as shown.

The finger bar H, of my improved machine is in general of the usual construction, having the ordinary shoe $p$, at its outer end, the series of fingers $q$, and the way to receive the reciprocatory sickle bar U, carrying the sickles $r$. This sickle bar U, has fixedly connected to it a strap or frame as V, and in this strap or frame is arranged a wheel or gudgeon W, for the engagement of the lever X, which has a cam groove to receive the wheel or gudgeon as illustrated. The lever X, is pivotally connected to the finger bar or frame H, at one end as indicated by $t$, and it is provided at an intermediate point of its length with an arm $u$, having a ball or globular head $v$, at its end designed to take into a socket at the forward end of the pitman Y, which pitman is connected at its rear end to a wrist pin $w$, on the crank wheel D, as shown. By reason of this construction it will be readily perceived that when the crank wheel D, is set in motion by the rotation of the axle A, the rotary motion of said wheel will be converted into reciprocatory motion and transmitted to the sickle bar by the pitman Y, and lever X. It will also be perceived that on account of the few parts intermediate of the crank wheel, and the sickle bar, there will be very little friction and consequently the reciprocation of the sickle bar will not materially increase the draft.

In order to prevent the objectionable wabbling or lateral play of the sickle bar in operation, and to aid the initial return movement of said bar, I provide the rack A′, which is fixedly connected to the cutter bar or frame H, the segmental rack B′, which is pivotally connected to the sickle bar (preferably through the medium of the shaft or axis of the wheel W,) and is designed to engage the teeth of the rack A′ and the spring C′, which is connected to the bar H, or to the rack A′, and engages the segmental rack B′, as shown. The said spring C′, is designed and adapted to press and hold the segment B′, in engagement with the rack A′, and when so held, the segmental rack will serve to keep the sickle bar in a straight line and will effectually prevent the objectionable wabbling or lateral play of the same, which is a desideratum.

The spring C′, through the medium of the segment B′, also serves to prevent shock when the sickle bar reaches the end of its outward stroke and aids the initial return movement of said bar and consequently renders the movement of the same more easy.

It will be seen from the foregoing description taken in connection with the drawings that my improved harvester is very simple and durable and while many of its parts are adjustable for various purposes they are not likely to get out of order.

I have in some respects specifically described the construction and relative arrangement of the several parts of the machine, but I do not desire to be understood as confining myself to such construction and arrangement as such changes or modifications may be made in practice as fairly fall within the scope of the invention.

Having described my invention, what I claim is—

1. In a harvester or mower, the combination with an axle supported by traction wheels, a casing or frame mounted on the axle, a head bar pivotally connected with the casing or frame and having apertured lugs $b$, a finger bar having eyes $c^2$, and also having a socket $k$, a bolt taking through the apertured lugs $b$, of the head bar and the eyes of the finger bar and serving to pivotally connect the finger bar with the head bar, and a suitable means for rocking the head bar; of a rock shaft secured in the socket $k$, of the finger bar and journaled in the casing or frame and having a segment, a lever also having a segment and a connection between the segments of the lever and rock shaft, substantially as specified.

2. In a harvester or mower, the combination with the finger bar and a rack fixed with respect to the same; of a reciprocatory sickle bar, a segmental rack pivotally connected to the sickle bar and engaging the fixed rack of the finger bar, and a spring engaging the segmental rack; said spring being adapted to hold the segmental rack in engagement with the fixed rack so as to cause the sickle bar to move in a straight line and being also adapted to aid the initial return movement of the sickle bar, substantially as specified.

3. In a harvester or mower, the combination of a finger bar, a rack fixed with respect to said finger bar, a sickle bar mounted on the finger bar and having a wheel or gudgeon connected thereto, a segmental rack pivotally connected to the sickle bar and engaging the fixed rack of the finger bar, the spring engaging the segmental rack, the lever pivoted on the finger bar and having a cam groove to receive the wheel or gudgeon of the sickle bar, and a suitable means for transmitting motion to said lever, substantially as specified.

In testimony whereof I affix my signature in presence of two witnesses.

PHILEMON BARBER.

Witnesses:
JOHN C. HOLDEN,
ANTHONY WISE.